March 24, 1953  C. P. SHERWOOD  2,632,733
WATER PURIFICATION PROCESS AND APPARATUS
Filed July 6, 1949  4 Sheets-Sheet 1

Fig. 1.

INVENTOR
Carroll P. Sherwood
BY Shoemaker & Mattow
ATTORNEYS

March 24, 1953  C. P. SHERWOOD  2,632,733
WATER PURIFICATION PROCESS AND APPARATUS
Filed July 6, 1949  4 Sheets-Sheet 3

INVENTOR
Carroll P. Sherwood
BY Shoemaker & Mattare
ATTORNEYS

Patented Mar. 24, 1953

2,632,733

UNITED STATES PATENT OFFICE 2,632,733

WATER PURIFICATION PROCESS AND APPARATUS

Carroll P. Sherwood, Camden, N. J.

Application July 6, 1949, Serial No. 103,243

11 Claims. (Cl. 210—26)

1

This invention relates to water purification process and apparatus.

There have been several processes and apparatus for purifying water including removal of iron and other mineral salts in solution. In the aforesaid known processes and apparatus, the water to be treated in most instances is not flowing and in series with the raw water supply and discharged ready for consumption or for use by industrial or commercial concerns. Such water has been aerated in some instances and, in others, the water is discharged into large sedimentation tanks or coagulation basins and various other tanks such as clarifiers after the water has been dosed with chemicals.

In these prior processes and apparatus for the purification of water, while resort has been made to aeration, sedimentation, coagulation, etc., there are many objections as to the time required to remove the iron and other mineral salts in solution in the water, $CO_2$ gas, etc., and also the apparatus used in the prior art is indeed quite large and expensive, both as to the cost of installation and maintenance of the same and the cost of the ground area necessary for the installation of these projects.

Also, in the prior water treatment processes and apparatus, it was simply a matter of filling a rather large tank or running water into the tank, whether it be a sedimentation tank or clarifier or a coagulation basin, and injecting some chemicals and air into the water to effect oxidation of the iron and other mineral content of the water but with no thought in mind as to the time element or the ratio of air with respect to the water and the lack of providing any means whatsoever to effect a thorough aeration of the entire cross section of the water stream or body, whether it be flowing or not. In other words, the water thus treated is only partially aerated and the majority of the body of water is unaerated. It is clear, therefore, that the treatment of the iron and other mineral salts in solution, in the water to effect oxidation thereof, and for its removal from the water by controlled ratio of air to the volume of water treated appears to have been overlooked or ignored and the water is not properly treated to render the same substantially free of iron and other mineral salts to make it potable and for use in certain industrial establishments; say for instance, where the water is an additive of certain food products, or in the dye and textile and other industries.

I have devised a water purification process and apparatus that is relatively inexpensive and

2 yet highly efficient, as compared with the prior known water purification processes and apparatus, and the apparatus is adaptable for ready installation in a building and, as it is not bulky, requires a minimum amount of space in the building. When my apparatus for carrying out the process is installed, the removal of the iron and other mineral salts in solution, and $CO_2$ gas, nitrogen, etc., from the water is quickly and substantially automatically accomplished.

Briefly stated, I accomplish the removal of substantially all of the iron and other mineral salts in solution from the water by treating a predetermined quantity of flowing water in a closed circuit apparatus and that circuit includes the flowing of water and the injection in the flowing water of air, the air being in sufficient and proper quantities with respect to the volume or quantity of water that is being treated and the known iron content in solution of the water.

In my process and apparatus, the aforesaid aeration may be an individual one or a plurality in a cycle for the travel of the predetermined amount of water and successive injections of air into the flowing water in the circuit and, at the end of each cycle, and in order that the injected air may effect the proper oxidation of the iron or other mineral salts in solution in the water, nitrogen, which is a deterrent for such oxidation, is expelled or removed. The removal of the nitrogen from each cycle, wherein air is injected into the water, is important in that, if this nitrogen were not removed, then the successive injections of air into the water would not have the proper effect to oxidize the iron and other mineral salts in solution in the water. It is obvious that, if the nitrogen is not removed from each cycle of aeration of the water, this nitrogen would dilute another or successive injections of air and thus render the air less effective each successive time.

Another important feature of my invention is the utilization of one or more diffusers in each cycle of travel of the water and air in the closed system. The diffusers serve an important purpose in that the aerated water flowing past and through these diffusers is thoroughly intermingled so that, in effect, there is a pin point intermingling and diffusion of the air throughout the entire flowing body of water in the system.

The hereinbefore cycle or cycles of treating the water to effect oxidation of the iron and other mineral salts in solution in the water, and which water is aerated and under pressure and from each individual cycle the nitrogen from the air has been removed, and as explained in detail hereinafter, consists of a coiled piping system and, it is in that system, where the flowing water under pressure is actually treated to oxidize the iron and other mineral salts in solution so that the thus oxidized iron and mineral salts is transformed into precipitates, and which precipitates in a second or subsequent filtering or filterings are readily removed from the water. The aforesaid precipitates are actually removed in one or more filters that are in series with and connected to the aforesaid coiled pipe system.

Depending upon the amount of iron and other mineral salts in solution in the water, it is thus determined the number of cycles of aeration and diffusion and removal of $CO_2$ gas and nitrogen that are required. Where the iron and other mineral salts in solution in the water to be treated are of a low content, perhaps one cycle, including aeration, diffusion and removal of $CO_2$ gas and the nitrogen, would be sufficient to properly prepare the water so as to form the precipitates for later removal but, where the iron and other mineral salts in solution in the water to be treated is relatively high in content, say 20 to 30 parts per million, the number of cycles of aeration, diffusion and removal of $CO_2$ gas and the nitrogen is accordingly increased and any number of these cycles of treatment of the water for oxidation of the iron and other mineral salts in solution to form precipitates may be utilized.

An important factor is the expulsion of the nitrogen from one or more of the aforesaid cycles of treatment of the water is that the elimination or expulsion of the nitrogen prevents the formation of the so-called white water. This white water is quite prevalent in a good many water treating and supply systems and, of course, is objectionable in that, when filled in a glass for drinking purposes the water appears milky and, one must wait until the water becomes transparent; and, too, the presence of white water in the operation of hydraulic devices and equipment is highly objectionable.

If the nitrogen is not removed from the water under treatment, and in addition to the dilution of the oxygen as hereinbefore referred to, there will be formed the white water which, of course, it is desirable to prevent. The nitrogen, if left in the system, would become absorbed by the water and, consequently, it is desirable to remove this nitrogen in the course of treating the water to prevent white water and dilution of the oxygen that is introduced into the succeeding cycles of the water treating system.

Where the iron and other mineral salts in solution in the water to be treated exceeds 25 parts per million, and where the maximum number of cycles of treatment of the said water, including aeration, diffusion and removal of $CO_2$ gas and nitrogen, has been utilized, it is advisable, under such circumstances, to effect oxidation and precipitation by the injection or utilization of ozone in and supplementing the aforesaid cycle treatment of the water. In some instances, where the iron and other mineral salts in solution in the water is extremely high, the oxidation and precipitation of the iron and mineral salts in solution can be accomplished by the use of ozone alone to oxidize the iron and other mineral salts in solution in the water.

Ozone, of course, is a strong oxidant when used alone, and is effective in the oxidation of iron and other mineral salts in solution in water but ozone equipment of sufficient size to handle any large gallonage of water would be so expensive as to be prohibitive. Thus, I believe the better procedure is to ozonate the water of high iron and mineral salts content of about 50 parts per million to effect oxidation and precipitation down to about 12 to 15 parts per million left in solution so that the lower iron and mineral salts water can then be relatively inexpensively treated in accordance with my hereinbefore recited process.

Another difficulty with respect to the use of ozone for the purification of water is the matter of injecting the ozone into the water under pressure and this presents quite a problem to overcome, as it cannot be accomplished with most of the known ozonators that are now available without a second pumping of all the water or through the means of an ejector or eductor resulting in the break-down of the water pressure in the down-stream flowing of the water.

I provide a new process and apparatus for injecting ozone, under pressure, into the flowing water that is to be treated for removal of the iron and other mineral salts in solution and, briefly, the same consists of a sufficient number of first coils of piping and diffusers in the said coiling of piping and a suitable pump to which the coiled pipe is connected to the suction side thereof, and which pump, when in operation, also has supplied to it through the coiling from the source of raw water about 5 percent of raw water and creating a suction in the coils and ozonator discharge, and this raw water and ozone, when traveling through the coiled piping, and due to the suction created by the pump, before reaching the suction pump, is thoroughly intermingled and is pulled through the piping through the suction action of the pump, and is then directly discharged back into the raw water source that enters a second coiled piping system wherein the said ozonized water is mixed with the raw water and then is successively diffused and relieved of $CO_2$ gas and nitrogen in one or more treatments in the cycles of the system.

In some instances, when using ozone exclusively, nitrogen, of course, will not be present. The water heavily loaded with ozone and when injected into the raw water supply, will not result in a break-down or decrease the effectiveness of the ozone as the reaction of the ozone with the mineral salts, causing oxidation of the mineral salts, has started and thus converting the salts to ferrous or ferric oxides which are insolvent in water.

In carrying out my invention, $CO_2$ gas, which is a very highly corrosive agent and which helps to hold the mineral salts in solution in the water, and which is in the water during the aeration and diffusion cycle or cycles and which aeration and diffusion tends to separate it from the water and the $CO_2$, is removed along with the nitrogen. About 80 or 90 percent of the $CO_2$ gas is removed along with the nitrogen in carrying out my process and any remaining traces of the $CO_2$ gas may be then subsequently removed by means of a carefully graded limestone or a very pure type which serves to neutralize acidity in the water and thereby greatly reduce the corrosive quality of water low in pH and high in carbon dioxide gas. This carefully graded limestone is deposited in a suitable tank and is hereinafter more fully described.

Referred to hereinafter, are three tanks, the first of which contains a charcoal or coke bed, which is in a controlled air chamber while being aerated from the bottom of the bed of charcoal or coke; the second tank which contains limestone or the like; and still a third tank which contains sand or the like, it being understood that the water that has been prepared to develop precipitates passes successively through the first, second and third tanks which are in series, and when such water passes the third tank, it is ready for use.

The action of the system is as follows: the prepared water trickles down through the coke or charcoal bed while being aerated upwardly from under the bed. This process results in the precipitates forming a mineral hydroxide, whether it be iron or manganese, which has an added attraction for the precipitates that follow. The water leaves the first tank with the mineral content greatly reduced and passes through the second tank containing usually a medium of pure limestone or the like for neutralizing the water by removing the remaining carbon dioxide and raising the pH of acid water to a more neutral point. The water leaving this second tank is practically void of mineral salts and carbon dioxide and chlorides and carbonates and enters the third and final filter of a sand medium which removes all minute floc and sedimentation.

The aforesaid tanks and coiled pipes are preferably interiorly coated with a bituminous or other coating which will insulate the metal tanks and pipe from the ozone in the water. The pipes constituting the coiled pipe system hereinafter described, may be of translucent Lucite or glass or only one of these pipes of each cycle constituting the coiled pipe system may be made of glass or Lucite so as to observe the pin point aeration of the water passing through the pipe.

If desired, to soften the water from which the mineral salts have been removed, any suitable base exchange material or other suitable media may be placed in the aforementioned second tank.

In treating mine water, which contains sulphuric acid and other acids, such water is thoroughly dosed with lime and/or soda ash or medias such as anion exchanger, neutralite or de-acidite placed in the first and/or second tank as the conditions require, and the thus dosed water is treated in the same manner by my process and apparatus as hereinbefore described.

With the foregoing in mind, it is an object of my invention to provide a relatively inexpensive, compactly arranged, yet highly practicable system, including process and apparatus for the purification of water by removing therefrom iron and other mineral salts in solution, also $CO_2$ gas and nitrogen and forming precipitates which are removed from the water and without utilizing any chemicals or other additions to the water except where mine water is treated in accordance with my process and this mine water is dosed with lime and/or soda ash. In treating artesian well water in accordance with my invention and other such water, no chemicals, however, are utilized or added to the water.

Another object of my invention is to provide a process and apparatus wherein confined flowing water is aerated, and the amount of air supplied to the water being in sufficient and proper quantities with respect to the volume of water so that the water is properly prepared and has successfully rapidly removed therefrom iron and other mineral salts, in solution, and other deleterious material such as $CO_2$ gas and nitrogen.

Another object of my invention is to provide a process and apparatus for treating confined flowing water with successive injections of air and successive diffusions of the aerated water to effect a thorough intermingling of the water and air, and the removal of formed nitrogen and $CO_2$ gas from the flowing aerated water, and thus preparing the water for removal of formed precipitates and the removal or separation of the precipitates from the water.

Another object of my invention is to provide a process and apparatus for treating confined flowing water with successive injections of air and successive diffusions of the aerated water to effect a thorough intermingling of the water and air, and the removal of formed nitrogen and $CO_2$ gas from the flowing aerated water, and thus preparing the water for removal of formed precipitates and the removal or separation of the precipitates from the water by means of one or more filtering steps.

Another object of my invention is to provide a process and apparatus for treating confined flowing water with successive injections of air and successive diffusions of the aerated water to effect a thorough intermingling of the water and air, and the removal of formed nitrogen and $CO_2$ gas from the flowing aerated water, and thus preparing the water for removal of formed precipitates and the removal or separation of the precipitates from the water by means of one or more filters in series of the steps.

Another object of my invention is to provide a process and apparatus for treating flowing water for removal or separation therefrom of iron and other mineral salts including aeration of the water, diffusing the aerated water and thus quickly forming precipitates and removing or separating the precipitates from the water.

Another object of my invention is to provide a process and apparatus for treating flowing water having the maximum, intermediate, and minimum mineral salt content, in proportion, in the water by aerating the water and diffusing the aerated water to quickly form precipitates, and removing the precipitates from the water.

Another object of my invention is to provide a process and apparatus for treating raw water for removal or separation therefrom of iron and other mineral salts including introducing a relatively small amount of ozonated raw water into the main source of untreated raw water and then thoroughly and rapidly aerating the ozonated water, or thoroughly and rapidly aerating raw water if no ozone is utilized, and diffusing the aerated ozonated water or the aerated raw water as the case may be and thus forming precipitates, and allowing the water with the precipitates to flow into a first treatment tank where the precipitates forming mineral hydroxide and the water, with its mineral contents greatly reduced, then flowing into a second tank where any remaining traces of $CO_2$ gas are removed and raising the pH of the acid water to a more neutral point, and then allowing the water from the second tank and which water is practically void of mineral salts, carbon dioxide, chlorides and carbonates, to flow into a third tank and pass through a filter medium which effects removal of all minute floc and sediment, and thus resulting in a thoroughly purified water, and where it is desired to soften the purified water, assuming the water is hard, a suitable base exchange material is added to preferably the second tank but this addition of the base exchange material is, of course, optional.

Another object of the invention is to provide a process and apparatus for treating raw water with ozone in a manner so that there does not occur a break-down of water pressure in the down stream flow of the water being treated.

Another object of the invention is to provide a process and apparatus for treating water with ozone whereby the ozone is added to a small amount of raw water taken from the source and the return of the small amount of the ozonated water to the raw water.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings.

The invention will be more readily understood by referring to the drawings in detail wherein like reference numerals in the several figures of the drawings denote the same elements or parts.

Figure 1:
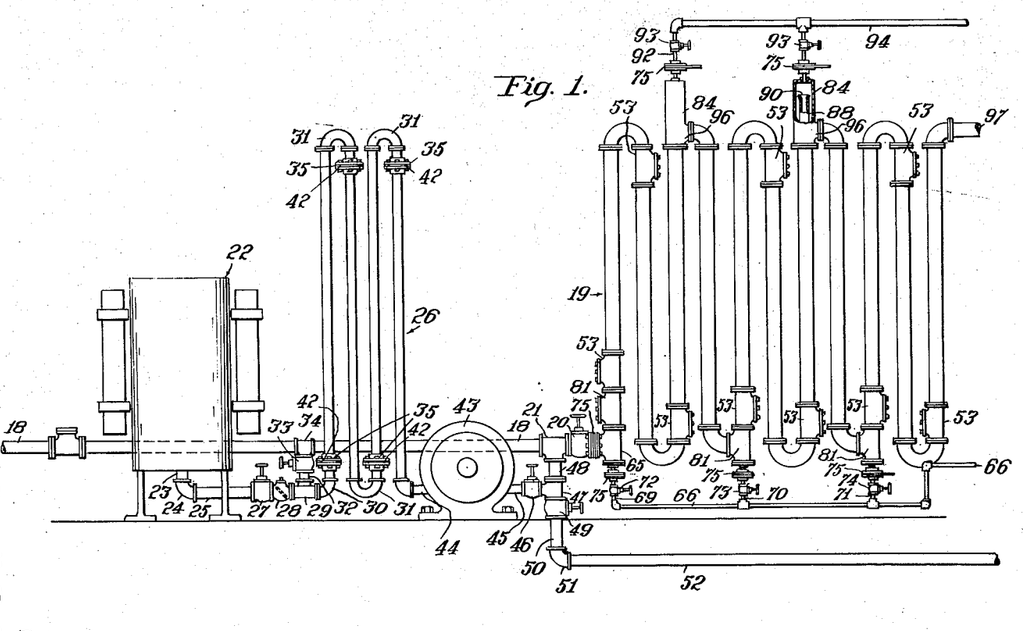
Fig. 1 is a side elevational, partial, diagrammatical view of a portion of the apparatus for carrying out my process.
Figure 2:
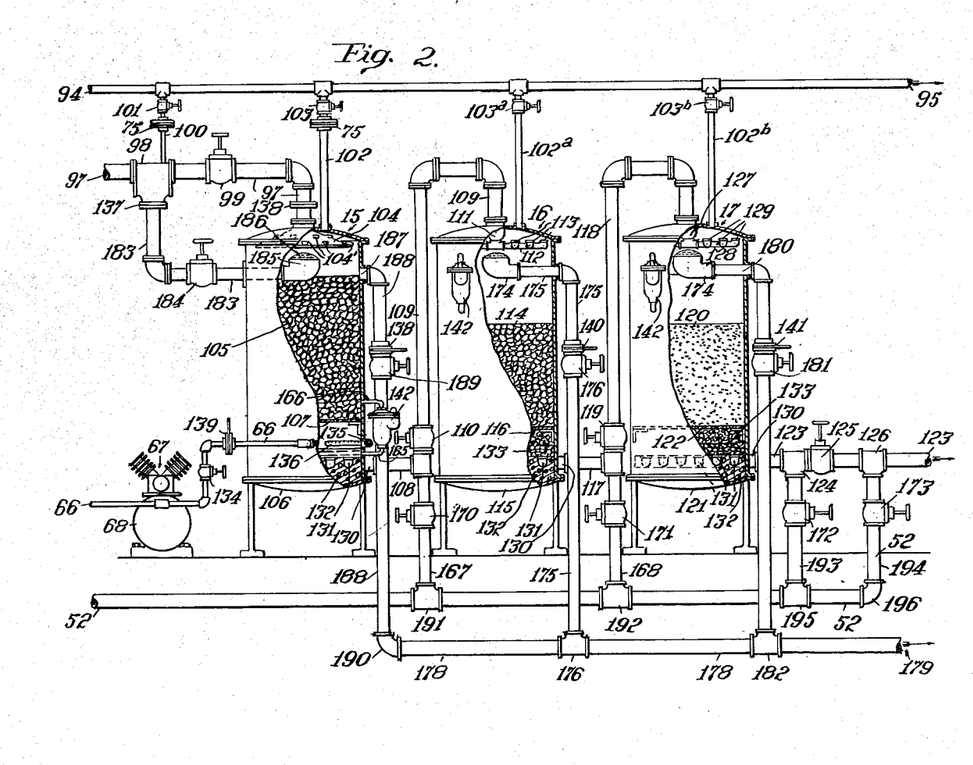
Fig. 2 is a similar side elevational partial view of the apparatus and is to be read as a continuation of Fig. 1.

As hereinbefore stated, Fig. 2 is a continuation of the apparatus as shown in Fig. 1 of the drawings and both of these figures are to be considered simultaneously and when thus considered, the apparatus, except for details shown in other figures of the drawings, is complete. The apparatus for purification of water for the removal of iron or other mineral salts in solution therefrom along with $CO_2$ gas and nitrogen consists of a plurality of tanks 15, 16 and 17 which tanks contain a trickling filter and a layer or bed of coke or the like; limestone or the like; and sand or the like, respectively. The three aforesaid tanks may, of course, be of any suitable or desirable capacity depending upon the amount of water that is to be treated.

Raw water enters the inlet supply pipe 18 from any suitable source such as from an artesian well and is connected directly with a coiled piping system denoted generally at 19, there being a valve 20 and a T coupling 21 in the connection between the end of the pipe 18 to the said coiled piping system 19. An ozonator 22 of any suitable construction and having an outlet 23 in the form of a short length of pipe connected with an elbow 24 at the end of pipe 25 and which is connected with a coiled piping system 26 which is located intermediate the ozonator and the coiled piping system 19. The pipe line 25 has a valve 27 therein attached to which there is a check valve 28 and attached to this check valve there is a T coupling 29, the end of which has attached thereto an elbow 30 and which elbow has attached to it the coiled piping system 26 which contains a plurality of coiled lengths of piping connected at their respective ends by substantially U-shaped connections or joints 31. The pipe 32 is connected to one of the outlets of the T coupling 29 and this pipe has connected therewith a valve 33 which valve is connected to a T coupling 34 in the raw water pipe line 18. Suitable and preferably fine wire mesh screens or diffusers 35 which constitute means for thoroughly intermingling ozone and a small portion of raw water are disposed in the piping system 26 as shown in Fig. 1 and as shown in detail in Fig. 7. The ends of the pipe wherein the diffusers 35 are disposed are exteriorly threaded as at 37 and about these threads there is disposed by means of interior threads 38 suitable flanged collars 39 which are provided with registering openings 40 and through which openings suitable bolts or other fastening means 41 extend in order to hold and maintain the screens in their proper position so that all water and ozone flowing therethrough must pass through these plurality of screens and thus be thoroughly intermingled. I preferably provide an extending tab or grip portion 42 which extends outwardly from each of the screens whereby these screens may be readily removed and replaced, if necessary.

A centrifugal pump 43 which may be operated by an electric motor, not shown, has attached at its suction side the end of a pipe 44 which is the last pipe in the coiled piping system 26. A pipe 45 which is the discharge pipe for the centrifugal pump has therein a valve 46 to which is attached a T coupling 47 and above this T coupling there is a joint or pipe 48 that connects with the T coupling 21 in the raw water pipe line and below the T coupling 47 there is another valve 49 to which is attached a pipe section 50 by means of an elbow 51, a pipe 52 is connected therewith and this pipe 52, when certain valves are opened and others closed, supplies raw water directly to the tanks in series hereinafter referred to for purpose of back-washing one or more of these tanks.

As aforesaid, the raw water pipe line 18 which is connected to a suitable source of supply extends directly into the coiled piping system 19 and discharges the raw water in this piping system wherein several cycles of treatment of the raw water which are separate and distinct are carried out. The valve 20 in the pipe line 18 and adjacent which one of the water orifices 75 is disposed, controls, of course, the water entering the coiled piping system 19. Disposed in this piping system 19 in proper spaced relationship there are a plurality of aerated water diffusers 53 and as shown in Fig. 1 there are three of such diffusers in each separate cycle of separation or treatment of the water. The construction of all of the diffusers 53 is the same and is shown in detail in Fig. 5 of the drawings. The diffuser consists of a hollow casing 54 which is substantially rectangular in outline, see Fig. 6, and the interior opposite side walls and bottom walls are provided with grooves 55 and in which grooves, there being a plurality of them, suitable diffusers 57 in the form of rectangularly shaped wire mesh screens are disposed. There are two such wire mesh screens in each diffuser element 57 and which screens are slightly spaced apart as denoted at 58 and the screens are held in spaced relationship by a metal ferrule or the like 59. The mesh of the screens is graduated, for instance, the first screen 60 may be of 40 mesh and the second screen 61 of 60 mesh, and the third screen 62 of 80 mesh, and the fourth screen 63 of 100 mesh and the last screen 64 of 120 mesh, but, of course, the mesh of the screens may be varied, as desired. The diffuser is provided with a removable cover 56 which is maintained in relationship therewith by suitable bolts 56'. The diffuser is provided with flanged ends $f$ having openings therein through which bolts $g$ pass through aligned openings in flanges $h$ at the ends of the pipe wherein the diffusers are secured.

Figures 5, 6, 7, 8, 9, 10, 11, 12:
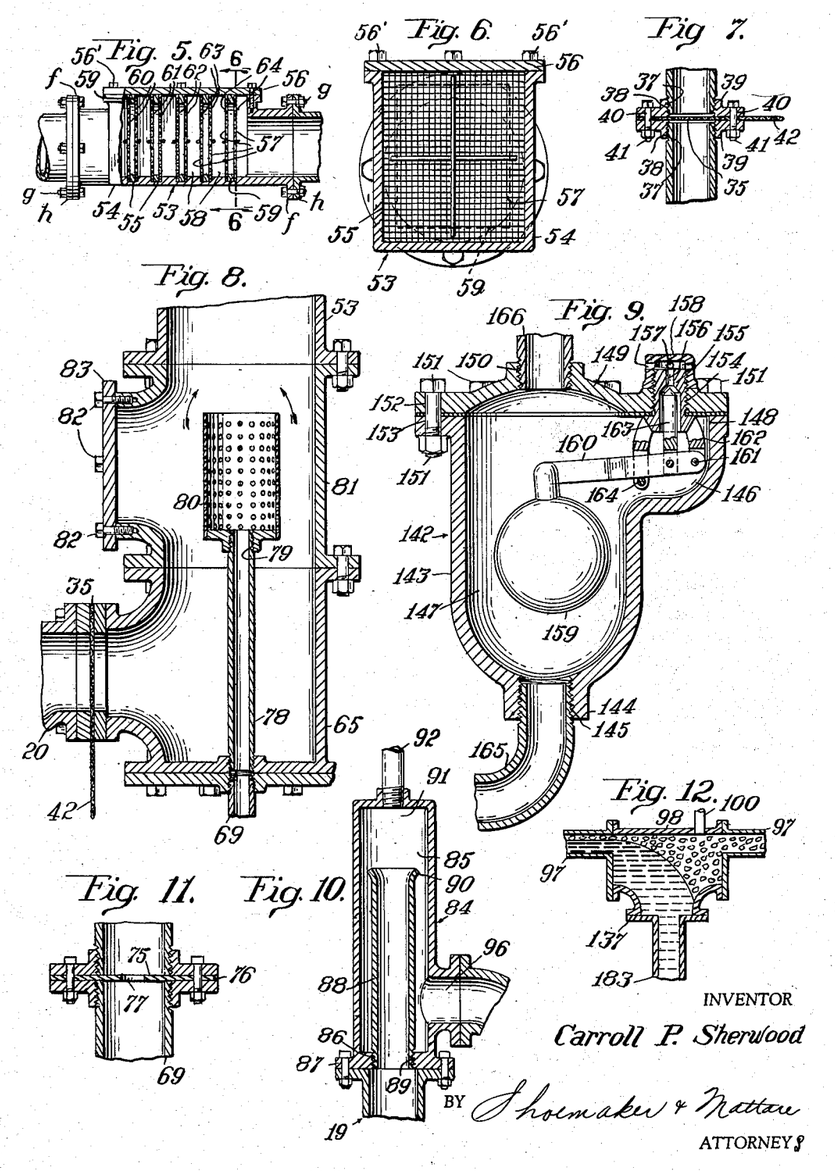
Fig. 5 is a side elevational view partly in vertical section of the diffuser.
Fig. 6 is a vertical cross sectional view looking in the direction of the arrows taken substantially on the line 6—6 of Fig. 5.
Fig. 7 is a vertical cross sectional view showing a screen or diffuser for the small amount of ozone and water.
Fig. 8 is a vertical sectional view of a ceramic air injector and mixing chamber of the water and air.
Fig. 9 is a vertical sectional view of a water level float valve.
Fig. 10 is a vertical sectional view of a combined $CO_2$ gas and nitrogen collecting and discharge chamber.
Fig. 11 is a vertical sectional view of an air and water orifice.
Fig. 12 is a vertical sectional view of a coupling in the piping system.

There is an enlarged T coupling 65 below the diffuser 53 in the first leg of the coiled piping system 19 and connected therewith is the water orifice 75 and one end of this T coupling 65 is suitably connected to the diffuser 53 in the first leg of the piping system 19 whereas the other end of the T coupling 65 has connected to it an air supply pipe line 66 which receives air from a conventional air compressor 67 that supplies compressed air to a tank 68 to which the pipe 66 is connected. The pipe 66 has suitable valve control take-off pipes 69, 70 and 71 and by means of valves 72, 73 and 74, air is injected through orifice controlled discs 75, shown in detail in Fig. 11. These orifice control discs 75 as seen in Fig. 11 are simply metal or other suitable discs 76 which have a central, calibrated, disposed opening 77 therein and are held in place by means of suitable flanges at the ends of a pipe such as shown in Fig. 7 for the wire screens 35, it being understood, of course, that the calibrated orifice control discs may be removed and replaced readily and that discs containing openings of different diameters may be utilized and thus the amount of air that is injected into one or more of the cycles of treatment of water in the piping system 19 may be regulated. The take-off pipes 69, 70 and 71 are all of the same construction as will be seen by referring to Fig. 8 wherein one of such pipes is shown enlarged and in detail and in this figure of the drawings, the pipe 69 is connected with the T coupling 65 at the bottom thereof and the pipe or an extension thereof 78 extends substantially medially through the T coupling 65 and is exteriorly threaded at its upper end 79 and has attached thereto an enlarged perforated ceramic air distributing outlet or head 80 that is located in the substantially T-shaped coupling 81 and there are three of these said couplings 81 in the piping system 19 as seen in Fig. 1 and the T coupling 81 has secured to it by means of bolts or other suitable fastening means 82, a removable cover 83 whereby the perforated ceramic air distributing head may be removed and replaced, if necessary, and of course, when the valves 72, 73 and 74 are open, air is supplied through the respective take-off pipes to the three said air outlets in the couplings 81.

In the upper bends of the first and second cycles of water separation in the coil piping system 19, there is attached in this system of piping suitable $CO_2$ gas and nitrogen collecting and discharging chambers 84, the construction of which chambers are identical and one of which is shown in Fig. 10 of the drawings. These chambers 84 are relatively elongated and preferably circular in cross section and, of course, are hollow as denoted at 85 and the lower end is provided with a central screw threaded opening 86 and a flange 87 and into which opening a relatively short length of pipe 88 by means of exterior screw threads 89 is connected and this pipe at its upper end 90 is preferably flared outwardly. Aerated water which contains $CO_2$ gas and nitrogen is flowing through the piping system 19 and after being diffused in one cycle such water flows outwardly over the flared end 90 of the pipe 88 in the collecting chambers 84 and the formed $CO_2$ gases and nitrogen collect in the upper part 91 of the chamber and escaping through pipe 92 in which there is a valve 93 into a pipe or manifold 94 and such gases are released as at 95 to the atmosphere and for storage of or suitable disposal thereof. As seen in Fig. 10, the chamber 84 is provided with an outlet 96 which, of course, is in the piping system 19 and from the first chamber, the aerated and degassed water flows to the second cycle of operation in the piping system 19 and the same is there again further diffused and degassed.

The thoroughly intermingled water and ozone, if ozone is utilized, and the thoroughly aerated and diffused water, with or without ozone, and degassed, after having been prepared in the three aforesaid cycles in the piping system 19 passes or flows through pipe 97 and in which pipe there is an enlarged T coupling 98 and a valve 99, and thence into the first treatment tank 15, the pipe 97 being connected therewith at the top thereof. There is a relatively small diameter pipe 100 with an air orifice 75 therein that is connected to the upper hollow portion of the T coupling 98, see Figs. 2 and 12, and this pipe has therein a valve 101 that is connected to the manifold 94 and the pipe 100 serves to conduct any remaining traces of nitrogen and $CO_2$ gas that may be in the water before the water is flowed into the first tank 15 and likewise from the top of this tank 15, there is a relatively small pipe 102 also with an air orifice 75 therein and a valve 103 and which pipe 102 is connected in the manifold 94 for the removal or any additional or further traces of $CO_2$ gas and/or nitrogen, should the same be present. Tanks 16 and 17 are provided with vent pipes 102a and 102b, and in each of which pipes or vents there is a valve 103a and 103b respectively, and which pipes connect with the manifold or pipe 94. The air orifice 75 adjacent the top of the separator 84 and the air orifices in vent pipe lines 100 and 102 are calibrated closely to the calibrations of the air orifices 75, shown, at the bottom of the coiled piping system 19, in Fig. 1. The purpose in calibration between these said air orifices is to show a relationship between these two orifices, the inlet and outlet because if the outlet orifices at the top of the cycles, Fig. 12, and the tank one are too large, there would be a waste of water.

Approximately 90% of the water flowing into tank 15 is from the bottom of the T coupling 98 and through pipe 103 that is connected with this tank. Approximately 10% of the water flowing through pipe 97 to the coupling 98 is in the form of mist which enters the tank 15 through pipe 97 where it is aerated. Thus the mist passing through the pipe 97 and entering the tank 15 passes through the dome shaped deaerator 104 and thence downwardly and through the body or layer of coke 105 in the said tank and which coke is supported above the bottom 106 of the tank by means of a false perforated bottom 107 and the substantially purified water from the tank 15 passes or flows through an outlet pipe 108 adjacent the bottom thereof into pipe 109 having a valve 110 therein and which pipe 109 is connected with the second tank 16 at the top thereof and at this connection there is a slightly enlarged head 111 through which the water runs and connected to which head there are a plurality of radially outwardly extending hollow pipes or arms 112 having upwardly directed nozzles 113 at the ends thereof so that the water entering the tank 16 flows upwardly and outwardly through the nozzles 113 and travels downwardly and through a limestone bed or layer 114 that is placed above the bottom 115 of the tank by means of a perforated false bottom 116. The water thus treated in tank 16 flows outwardly from and adjacent the bottom thereof through a pipe 117 and which pipe is connected with a pipe 118 having a valve 119 therein and the end of this pipe 118 is connected directly with the upper central portion of the third or last tank 17 and which tank is in effect a sand filter and contains a body or layer of sand 120 which is supported above the bottom 121 of the tank by means of a false perforated bottom 122 and the water from this last or third tank 17 passes outwardly through pipe 123 and in which pipe there is a T coupling 124 adjacent which there is a valve 125 and another T coupling 126.

The end of the pipe 118 leading into the top of tank 17 has a somewhat enlarged head 127 connected therewith and connected with this head there are a plurality of radially outwardly extending hollow pipes or arms 128 having at their ends suitable water outlet nozzles 129 and which pipes and nozzles and head are similar to the pipe 112, nozzle 113 and head 111 positioned in the upper portion of tank 16. It is clear, therefore, that the treated water that is discharged through pipes 109 and 118 into tanks 16 and 17 respectively, is actually discharged upwardly in the tank and falls by gravity down on to the filter material in the tank.

The water discharge pipes 108, 117 and 123 that are positioned adjacent the bottom of the tanks 15, 16 and 17 respectively, are in fact continuations of or attachments to under-drains that are positioned adjacent but spaced from the bottom of the three said tanks. These under-drains 130 are all of the same construction and merely consist of a central header or collecting pipe which extends around the bottom of the tank and above the same and there are hollow arms or pipes that extend outwardly from each side of this pipe and these hollow arms or pipes are provided with one or more upstanding, screened, hollow cup collectors 131, the upper portions of which collectors in each of the tanks being substantially in the same plane of a body of solid concrete 132 in the bottom of each of the said tanks. Superimposed on the solid concrete body in the bottom portions of each of the tanks 15, 16 and 17, there is a layer or layers of stone and gravel 133.

The air supply pipe line 66 from the compressed air tank 68 in addition to supplying air to the aforesaid coiled piping system also supplies air to the first tank 15 and effects a final aeration of the water in that tank. There is, of course, a valve 134 in the air line 66 for controlling the air that enters the tank 15 and this air line 66 connects with a circular or ring-like hollow header 135 that extends exteriorly of the tank 15 and about the circumference thereof and there are a plurality of radially inwardly extending perforated pipes 136 that extend interiorly of the tank through openings in the side walls of the tank and thus air is directed outwardly through the perforations in the radially inwardly extending pipes or arms and this discharged air travels upwardly through the perforated bottom 107 in the tank 15 and thoroughly permeates the coke or other filtering bed therein and the water, of course, that flows downward within this air chamber.

Various orifice control discs 137, 138, 139, 140 and 141 are interposed in the aforesaid water and air piping systems and these discs are all of the same construction or similar to the discs 76, see Fig. 11. These discs provided with an opening centrally thereof or eccentrically disposed with respect to the center are interchangeable and it is clear, therefore, that by providing selected discs with the opening that would allow a predetermined amount of air or water to flow therethrough, the said air and water is thus controlled in its flow through the piping and disc systems. It is understood, of course, that the orifice controls may be placed at any suitable point in the mentioned piping systems and any number of such controls, as may be required, may be utilized.

The valve 142 of each tank, is of the same construction and this valve is shown in Fig. 9 where it will be noted that the same consists of an outer casing 143 that is substantially cylindrical in cross section and reduced at its lower end 144 and interiorly screw threaded at 145 and at the upper end and laterally projecting from one side thereof but integral with the casing 143, there is a small chamber 146 provided in the lateral extension that connects with the main chamber 147 in the valve casing. The upper end of the valve casing 143 is closed by a closure 149 having an interiorly screw threaded opening 150 and this closure is maintained on the valve casing by suitable bolts 151 which pass through registered openings 152 and 153 respectively in the flange of the cover and the flange of the valve casing. The cover or closure 149 is also provided with interior screw threads 154 that are positioned directly above the compartment 146 and in which interior screw threads a valve seat 155 is positioned and this valve seat has an opening 156 therethrough that connects with radially outwardly extending openings 157 in an interiorly screw threaded cap closure 158 for the valve seat. Float 159 has connected therewith an arm 160 and which arm is pivoted at 161 to a fixed bracket 162 and this arm carries thereon a valve 163 that is adapted to be moved into and out of seating engagement with the valve seat 155 to thereby control the amount of air that discharges through the opening 156 of the valve seat and the radially outwardly extending openings 157. Downward movement of the float valve 159 and its lever 160 are limited by a stop means 164 that is connected with and forms part of the spider or pivotal mounting means 162 and which pivot mounting means and stop means are disposed in the hollow laterally extending chamber 146. The valves 142 are each connected with the respective tanks 15, 16 and 17 by means of hollow pipes or tubes 165 which is connected with the interiorly screw threaded opening 145 at the bottom thereof and at 166 which is the top tube or pipe that is similarly connected to the interior screw threads 150 of the closure 149 and the free end of these tubes or pipes 165 and 166 are suitably welded or screw threadedly attached by means of a union or connection not shown to each of the tanks 15, 16 and 17 and communicate with the interior of these tanks.

Having hereinbefore described the water preparation and treatment process and apparatus, I now come to that part of the process and apparatus relating to the back washing or cleaning of the several tanks 15, 16 and 17. It being understood that in carrying out any treatment or filtering process where sediment, floc, or oxidized particles which are removed from a liquid or fluid, the filter or filters wherein the liquid or fluid is treated must necessarily be cleaned and this is accomplished by a so-called back washing of the filter media within one or more tanks, to remove from the tanks the undesirable material that has been separated from the liquid or fluid. I accomplish the back washing in my process and apparatus by providing the pipe line 52 which when valves 20 and 33 are closed and valve 49 is opened allows raw water from the inlet pipe line 18 to by-pass the piping systems 19 and 26 and flow directly into pipe 52 which pipe has separate take-off pipes 167, 168 and 193.

When valves 99, 184, 110, 119 and 125 are closed with valves 189, 176 and 181 opened, valves 170, 171 and 172 can be opened separately or simultaneously for back washing one tank at a time or the three simultaneously.

For back washing tank 15, valves 99, 184 and 110 are closed. Valve 189 leading to waste is opened, valve 170 is then opened admitting water to the tank through the under-drain system through pipe 108 which water flows upwardly through the trickling filter medium carrying with it precipitates and the like out of pipe 187 and 188 through orifice 138 to disposal through pipe 178. When this medium is determined clean these valves are reversed and placed in original opened and closed position for operation of the tank. For back washing tank 16, valves 110 and 119 are closed and valves 176 and 171 are opened, the water flowing upwardly through the under-drain system of tank 16 through pipe 117 upwardly through the limestone or the like bed out through strainers 174 of pipe 175 and through orifice 140 to wasteline 178. When this medium is considered clean, these valves are placed in a reversed position, the same as they were before beginning the backwashing process.

For back washing tank 17, valves 119 and 125 are closed. Valves 181 and 172 are opened causing the back wash water to flow through the under-drain system through pipe 123, upwardly through the filtering medium carrying with it sedimentation and impurities through strainer 174, pipeline 180, orifice 141. When this filtering medium is determined clean these valves are likewise placed in reverse position or in their original position placing this tank back in service.

In order to by-pass the entire treatment and filtering system this is accomplished by closing off valves 20, 33, 170, 171 and 172 and opening valves 49 and 173 for by-pass purposes. With this arrangement of piping, it will be seen that if there is a break-down of the system or apparatus or back-washing of same, it is simply necessary to open and close the proper valves so that the raw water from pipe 18 runs directly out through pipe 52 into the water discharge outlet pipe 123 and thus the user will have a constant supply of water.

Hereinbefore I have mentioned the use of the orifice control discs which regulate the amount of air and water that is supplied to the system. These orifice controlled discs are quite effective and perform efficiently, it being understood that the discs with the proper openings therein are selected and inserted in the system, when it is known what amount or volume of water with relation to the air that is to be supplied to the system for treating the particular water, the deleterious contents of which have been predetermined, and by deleterious contents, I mean the iron salts, etc., that are in solution in the water. This regulation of the amount of air supplied to the system with relation to the amount or volume of water that is being treated may, however, be accomplished in another manner more or less automatically, by means of suitable conventional types of differential pressure regulating valves. One of these differential pressure regulating valves is shown in Fig. 4 of the drawings and in Fig. 3 of the drawings, the pressure regulating valves are schematically and diagrammatically shown as being associated with the No. 1 tank of the system, which is tank 15.

The differential pressure regulating valve denoted generally at 197 and which consists of a usual valve proper 198, valve seat 199, stem 200, and, of course, the usual valve body 201 and the screw threaded plug 202 in the bottom thereof and the usual inlet opening 203 and outlet opening 204. Above the valve casing 201, there is positioned a bonnet 205 which has oppositely disposed slots or openings 206 therein and which bonnet is closed at its top at 207 which in effect is the bottom of the diaphragm containing casing 208 and into which diaphragm casing extends a continuation 209 of the valve stem 200 and the upper end of this valve stem extension or continuation is attached at 210 by means of nut 211 to oppositely disposed cup shaped members 212 which contact both sides of a flexible diaphragm 213 and which diaphragm 213 is mounted in the two part diaphragm casing 208 between flanges 214 and 215 that are respectively flanges on the diaphragm casing 208 and the removable upper portion thereof 216. The valves are held together by means of bolts or the like 217 and the peripheral portion of the diaphragm 213 that is between these flanges, and if not of rubber may be suitably gasketed, and which gaskets are not shown. The cap or upper portion of the diaphragm casing 216 is provided centrally with a screw threaded opening 218. Mounted intermediate the extension 209 of the valve stem 200 and extending through the opposed slots or openings 206, there is a weight carrying arm 219 pivotally mounted as at 220 on an inward projection 221 at one of the slots 206 and the free end of the weight carrying arm 219 has adjustably attached thereto a suitable weight 222. This weight is as stated adjustable lengthwise of the arm 219.

Figure 3:
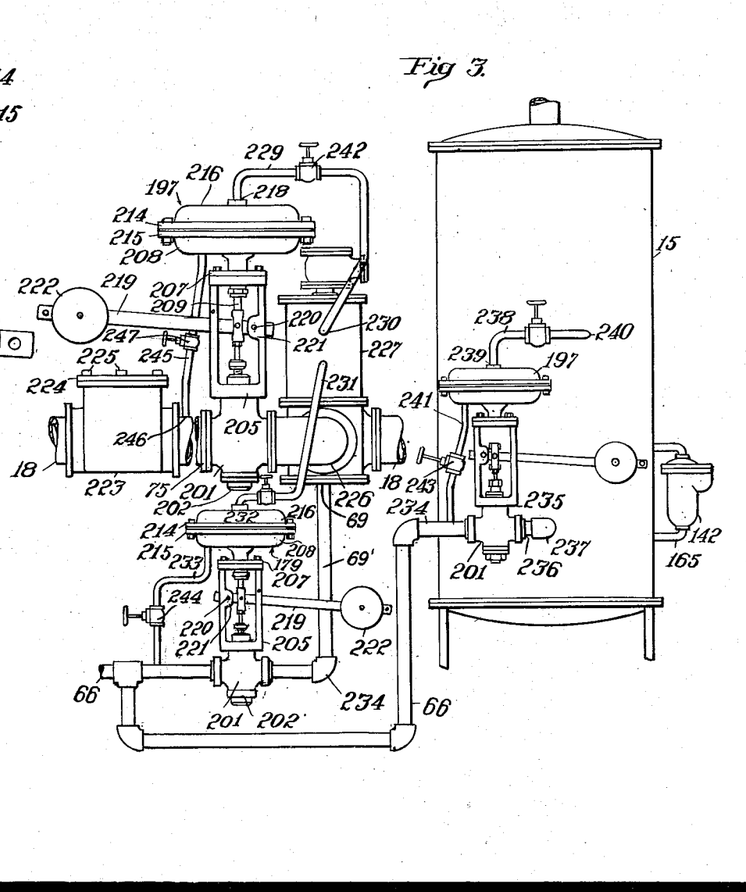
Fig. 3 is a side elevational partial view of a modified form of the apparatus.
Figure 4:
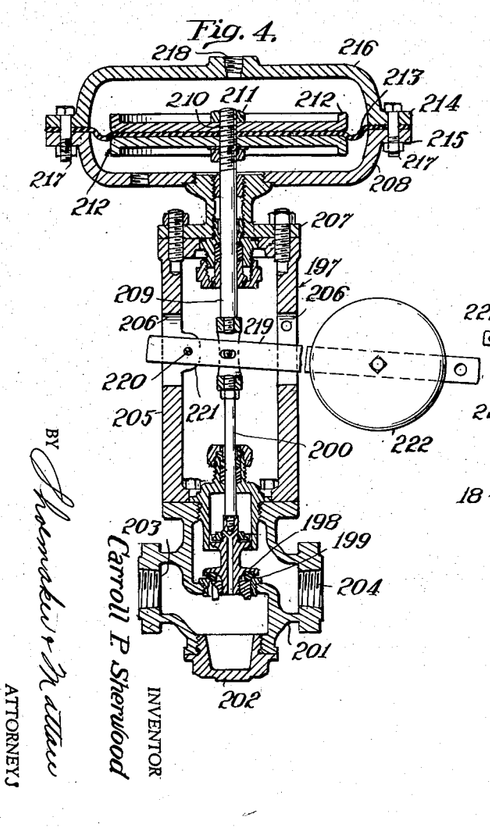
Fig. 4 is a vertical cross sectional view of a conventional pressure regulator.

Having described the differential regulator valve, and which valve is identical for use in regulating both the air and water utilized in my system, and by referring to Fig. 3 of the drawings, it will be seen that I am utilizing three such valves 197 in the diagrammatical illustration of the water treating system for one cycle and final aeration, it being understood that two additional valves are required for each additional cycle. The raw water inlet is denoted at 18 and this pipe line may contain a strainer 223 therein and this strainer has one or more wire mesh screens and is provided with a removable closure 224 which is held on the strainer by means of the bolts or the like 225. The pipe 18 connects with the inlet opening 203 on the valve 201 and the water flowing through this pipe 18 and into the valve casing 201 flowing outwardly through the outlet opening 204 whereat there is an elbow 226 that is connected with an aerator 227 which, of course, is similar to the aerator 65 in Fig. 1 of the drawings and as a matter of fact this can be taken as this same aerator 65. As I have mentioned the construction of all of the valves shown in Fig. 3 of the drawings and generally denoted at 197 are identical with the valve structure shown in Fig. 4, and I shall now refer to these valves separately as they are placed in the system which includes valve 197 that is connected in the raw water line 18 by means of the valve casing proper 201, and the upper part of the diaphragm casing 216 has a relatively small pipe or tubing 229 screw threadedly attached in the opening 218 and communicating with the interior of the diaphragm casing on one side of the diaphragm and in this instance the tube 229 is attached at one end to the chamber at one side of the diaphragm 213 therein and is connected at its other end 230 with the aerator 227 and the water pressure, of course, is on the other side of the diaphragm 213 through the medium of the valve stem 200 and its extension 209 which is controlled by the weight 222 of the arm 219. Similarly, there is pipe or tubing connection 231 connected with the aerator 227 that extends to and connects to the upper part of valve 232 and thus water and air from the aerator communicates with the compartment above the diaphragm. Air also communicates with the compartment below the diaphragm 213 by means of a pipe or tubing 233 that is connected in the air line 66 as shown in Fig. 1, and this air line is supplied with air from the compressor and the compressed air tank as in Fig. 1. The air line 66 has connected therein the valve body 201 of valve 232. A valve 235 has a pipe or tubing 238 connected with the top thereof at 239 and which pipe communicated directly with the interior of tank 15 as denoted at 240 and this pipe communicates with the interior of the diaphragm chamber on the upper side thereof whereas the lower side of the diaphragm chamber is in communication by means of pipe 241, directly in a continuation of air pipe line 66. Air enters tank 15 through pipe 236 and the nipple 237 which is attached to and communicates with the tank 15. An air take-off pipe 69', shown in Fig. 3, is connected from valve 201 in air pipe line 66 and extends into the aerator 227 at 69 in Fig. 8.

In view of the foregoing description of the valves utilized in the diagrammatic showing of the system and apparatus in Fig. 3, it is clear, therefore, that as the water flows through the pipe 18 and water orifice 75, valve body 201, the pressure differential between the downstream and upstream water pressures and the air pressure regulating valve performing in the same manner will automatically regulate the ratio of air and water during various flows and pressures through the aerators.

In this Fig. 3, I have shown valves 242, 243 and 244 in the pipes or tubings 229, 241 and 233 respectively.

In the valve 216 there is a pipe line or tubing 245 connected with the chamber on the lower side of the diaphragm 213 and the other end of this pipe is connected directly at 246 into the raw water pipe line 18 and in this pipe or tubing there is a valve 247. Thus the amount of air and its pressure on the diaphragm and the water pressure on the diaphragm by means of the said valve may be regulated. Also in Fig. 3, I have shown a float valve 142 which is identical with the float valves so numbered in Fig. 2 of the drawing and have denoted the normal water level in the tank 15 at 143.

In the drawings and in the hereinbefore description of the invention, I have disclosed three cycles of operation of this system but it is to be distinctly understood that as many cycles as necessary can be used to treat the raw water and the necessary number of cycles is determined, of course, from an analysis of the water to be treated. Furthermore, I have referred to coke or charcoal in tank 15 and it is understood that in addition to these filter materials, slag, scrap iron or any other material may be utilized in this tank. Also as regards the limestone in tank 16, the particular material that is selected and used in this tank depends upon the characteristics of the water that is treated, this being determined by analysis of the water, that is, whether the water is acid or alkali and has an objectionable color or taste and further in order to correct the addition as regards color, taste, etc., and balance the pH. Limestone, carbon or activated carbon, green sand or zeolites of any kind may be utilized in the tank 16.

As regards tank 17 which is a finishing filter removing all traces of floc and practically all traces of impurities left in the water, some of the filtering media that may supplant the filter are hard silica sand or graded hard silica sand, graded anthracite, graded anthrafelt, hematite, etc.

In a pilot plant that I have constructed and have operated under normal conditions for treating water from the water supply system of the city of Camden, New Jersey, I have found that without the use of any chemicals that substantially all of the carbon dioxide gas and nitrogen, chlorides and the iron content or other mineral salts have been most effectively removed from the water and when the water is hard and treated accordingly, the water is thus softened and if the water is of acid content, the pH is substantially neutralized.

I have also found that I can extract salt from brackish water by treating the water in accordance with my process and apparatus hereinbefore mentioned. This I accomplish by placing grated or diced Irish potatoes in tank 16 in lieu of the limestone and the brackish water is treated in the same manner as hereinbefore described. The potatoes, of course, absorb the salt from the water.

Typical analyses of water treated in my pilot plant which are only two of the many arrangements and selection of elements and treating media to obtain a certain quantity of effluent water are as follows:

Aeration _______________ 2 C. F. per 100 G. P. M. of water.
Tank 15, Trickling Filter _______ Coke bed in air chamber of water system.
Air in Tank 15, final Aeration _____ 6 C. F. per 100 G. P. M. of water
Tank 16, Roughing Filter Medium _ ¼" common limestone.
Tank 17, Rapid Sand Filter _______ Sand and gravel.

|  | Raw Water | Under Elements 1-2-3 | Under Element 4 | Treated Water |
|---|---|---|---|---|
| pH | 5.9 | 6.3 | 6.3 | 6.4 |
| Carbon Dioxide, as CO$_2$ | 84 | 40 | 36 | 24 |
| Total Alkalinity, as CaCO$_3$ | 42 | 40 | 40 | 40 |
| Total Hardness, as CaCO$_3$ | 54 | 60 | 64 | 62 |
| Chlorides, as Cl | 12 | 10 | 12 | 10 |
| Total Dissolved iron, as Fe | 3.6 | 2.6 | Tr. | 0 |

Adjustment made to reduce the carbon dioxide as CO$_2$, removal of iron as Fe$_2$ and raise the pH with a water flow of 6 gallons per square foot of treatment area.

Aeration _______________ 2 C. F. per 100 G. P. M. of water
Tank 15, Trickling Filter _______ Coke bed in air chamber of water stream.
Air in tank 15, Final Aeration _____ 6 C. F. per 100 G. P. M. of water.
Tank 16, Roughing Filter Medium _ 10-20 mesh pure limestone.[1]
Tank 17, Rapid Sand Filter _______ Sand and Gravel.

[1] The ¼" common limestone was replaced with a crushed and very carefully graded limestone of a very pure type passing a 10-20 mesh screen. It is used to neutralize acidity, reduces corrosive quality of water that is low in pH and high in CO$_2$.

|  | Raw Water | Under Elements 1-2-3 | Under Element 4 | Treated Water |
|---|---|---|---|---|
| pH | 6.1 | 6.7 | 6.6 | 7.1 |
| Carbon Dioxide, as CO$_2$ | 80 | 38 | 16 | 9 |
| Total alkalinity, as CaCO$_3$ | 40 | 40 | 64 | 62 |
| Total hardness, as CaCO$_3$ | 52 | 60 | 66 | 64 |
| Chlorides, as Cl | 11 | 9 | 10 | 10 |
| Total dissolved iron, as Fe | 3.8 | 2.4 | 0.1 | 0 |

Adjustment was made to neutralize the carbon dioxide CO$_2$, raise the alkalinity, raise the pH and removal of iron with a water flow rate of 6 gallons per square foot of treatment area.

The raw water supplied to the system is under pressure.

I desire it distinctly understood that by utilizing various and different kinds of treating media in tank 16, I can further treat water which has had the mineral salts extracted and further treat any particular quantity of water in tank 16 to produce any quality of water at the effluent required. By this I mean treating the water in tank 16 which has previously been treated for removal of mineral salts in solution and relieved of CO$_2$ gas and nitrogen. The water thus treated may be acid, alkaline, and may have an objectionable odor, taste and color and may contain chlorides, cations, bacteria and other impurities, all of these undesirable characteristics can be corrected by utilizing the proper treating medium having the necessary inherent quality in tank 16 in lieu of the limestone referred to.

I have hereinbefore referred to the back-washing of the system with water but I distinctly want it kept in mind that the back-washing of the tanks can be accomplished by use of water alone or a combination of water and air. This obviously may be accomplished by extending the air valve line 66 and connecting it by take-off pipes, not shown, with pipes 108, 117 and 123 and when this is done, both water and air will travel upwardly through the medium in each of the tanks 15, 16 and 17 and effect a more thorough cleansing of the medium through the back-washing of the tanks.

I claim:

1. Apparatus for purifying continuously flowing raw water containing mineral salts in solution incluuding a pipe line having vertical sections spaced transversely from each other and interconnected at upper and lower ends, diffusers interposed vertically in the pipe sections adjacent ends thereof and each consisting of a vertically disposed cylindrical casing open at upper and lower ends, and a plurality of mesh screens in the casing spaced from each other longitudinally of the casing and disposed transversely of the casing and extending the entire distance between opposite wall portions thereof whereby water flowing through the pipe line passes through the meshes of the screens and is divided into fine streams for the entire cross section of the flowing water, and air inlet tubes disposed under and extending upwardly into said pipe line directly under the diffusers located at lower ends of the pipe sections and having upwardly presented nozzles at their upper ends dividing incoming air into fine streams.

2. Apparatus for removing mineral salts in solution from a confined body of continuously flowing water including a pipe line having vertical sections disposed in side-by-side relation to each other and interconnected by couplings at upper and lower ends, air inlet tubes extending upwardly into the couplings connecting lower ends of certain of said pipe sections and having perforated nozzles at their upper ends dividing incoming air into upwardly moving streams spaced transversely from each other throughout the transverse area of the flowing water, and open ended diffusers open at its upper and lower ends interposed vertically in the vertically extending sections of the pipe line and each having mounted therein a plurality of fine screens spaced from each other longitudinally of the casing and extending transversely in the casing and entirely across water flowing through the pipe line for the entire cross-sectional area thereof and constituting means for causing a mixture of water and air to be divided into fine streams as it passes through the screens and thereby resulting in mineral salts in the water being oxidized.

3. Apparatus for removing impurities from a confined body of flowing water including a pipe line having a portion formed with vertically disposed reversely extending sections, means for spraying air upwardly under pressure into lower ends of certain of said sections for mixing with the flowing water, and a plurality of diffusers interposed in the pipe sections and spaced longitudinally of the pipe line from each other, certain of said diffusers being located at lower ends of the pipe sections above and adjacent the air inlets, each diffuser having a casing open at upper and lower ends, and screens in said casing spaced longitudinally from each other and each occupying the full transverse area of the casing and formed with a multiplicity of small openings throughout its area for passage of the flowing water and air through the screens and resulting oxidizing of impurities in the water.

4. Apparatus for removing mineral salts in solution from a confined body of flowing water including a pipe line having vertically disposed oppositely extending connected sections, means for directing air under pressure upwardly into lower ends of certain of the pipe sections for intermingling with the flowing water, and diffusers interposed vertically in said pipe line between connected ends of said sections and each consisting of a casing open at its opposite ends and pairs of fine screens in the casings spaced from each other longitudinally thereof and each formed with a multiplicity of openings distributed throughout the transverse area of the casing and dividing the flowing water into fine streams as the water passes through the screens and from which water the mineral salts are removed by oxidizing.

5. Apparatus for removing mineral salts in solution from a confined body of flowing water including a pipe line having longitudinally spaced diffusers interposed therein, each diffuser having a casing open at opposite ends, and metal screens mounted in the said casing and extending transversely thereof for the entire cross section of the casing and each being formed with a multiplicity of small openings constituting water passages distributed throughout its area, and means for injecting streams of air under pressure into the pipe line in advance of certain of said diffusers.

6. Apparatus for removing mineral salts in solution from a confined body of flowing water including a pipe line having therein a coil formed of vertically disposed pipe sections spaced transversely from each other and having upper and lower ends connected in series by couplings, diffusers each interposed between a coupling and the inlet end of an adjoining pipe section, and air injectors connected with couplings connecting lower ends of certain of said pipe section and discharging air upwardly into water flowing through the pipe line, said diffusers each consisting of a casing open at upper and lower ends, and a plurality of screens in said casing disposed transversely therein and spaced from each other longitudinally of the casing.

7. The structure of claim 6 wherein certain of the couplings at upper ends of the pipe sections have associated with them outlets for a mixture of air and other gases, the said outlets each consisting of a cylindrical casing disposed vertically above and in aligned communication with a pipe section through which water flows upwardly, and a tubular nozzle disposed vertically in said casing in spaced relation to the walls thereof and having its lower end communicating with the said pipe section and its upper end open and spaced downwardly from the upper end of the casing.

8. The structure of claim 6 wherein means is provided for delivering ozone into the water flowing through the pipe line before the water enters the coil.

9. Apparatus for removing mineral salts in solution from a confined body of flowing water under pressure including a pipe line having longitudinally spaced diffusers interposed therein, each diffuser including screens mounted so as to extend transversely of the body of flowing water and across its entire cross-sectional area, each of said screens having a multiplicity of fine openings therethrough constituting minute water passages through which all of the flowing water must pass to be subdivided into a multiplicity of fine streams, and means for injecting air under pressure into the body of water ahead of each diffuser so as to become thoroughly intermingled with the water when passing through the screens to thoroughly oxidize the impurities in the water to form precipitates.

10. Apparatus according to claim 9 additionally including means controlling the quantity of air injected into the flowing body of water according to the quantity of water being treated.

11. The process for removing mineral salts in solution comprising the steps of passing a confined body of water under pressure through a pipe line, injecting air under pressure into the passing confined body of water, and thereafter repeatedly dividing the body of water across its entire cross-sectional area into a successive series of multiple streams so as to thoroughly intermingle and diffuse the air throughout the entire body of water, and controlling the quantity of air injected into the flowing body of water according to the quantity of water being treated so as to effectively oxidize the impurities to form precipitates for removal.

CARROLL P. SHERWOOD.

REFERENCES CITED

The following references are of record in the file of this patent:

UNITED STATES PATENTS

| Number | Name | Date |
|---|---|---|
| 373,867 | Trowbridge | Nov. 29, 1887 |
| 507,774 | Ball | Oct. 31, 1893 |
| 813,517 | Pfautz | Feb. 27, 1906 |
| 938,075 | Reisert | Oct. 26, 1909 |
| 1,103,211 | Knips | July 14, 1914 |
| 1,189,114 | Irwin | June 27, 1916 |
| 1,199,380 | Hiller | Sept. 26, 1916 |
| 1,590,120 | Perry | June 22, 1926 |
| 1,594,947 | Hartman et al. | Aug. 3, 1926 |
| 1,907,691 | Wait | May 9, 1933 |
| 1,958,118 | Szegvari | May 8, 1934 |
| 1,984,219 | Krogh-Lund | Dec. 11, 1934 |
| 2,048,158 | Goodwin | July 21, 1936 |
| 2,210,846 | Aghnides | Aug. 6, 1940 |
| 2,237,882 | Lawlor et al. | Apr. 8, 1941 |
| 2,316,832 | Aghnides | Apr. 20, 1943 |
| 2,320,512 | Daily | June 1, 1943 |
| 2,352,901 | Kleen | July 4, 1944 |
| 2,370,772 | Bowers | Mar. 6, 1945 |
| 2,532,565 | Miller | Dec. 5, 1950 |

FOREIGN PATENTS

| Number | Country | Date |
|---|---|---|
| 143 | Great Britain | of 1894 |